April 19, 1966     H. E. ERIKSON     3,247,378
RADIATION DETECTION DEVICE WITH AN INTENSIFIER SCREEN
Filed May 25, 1962     2 Sheets-Sheet 1
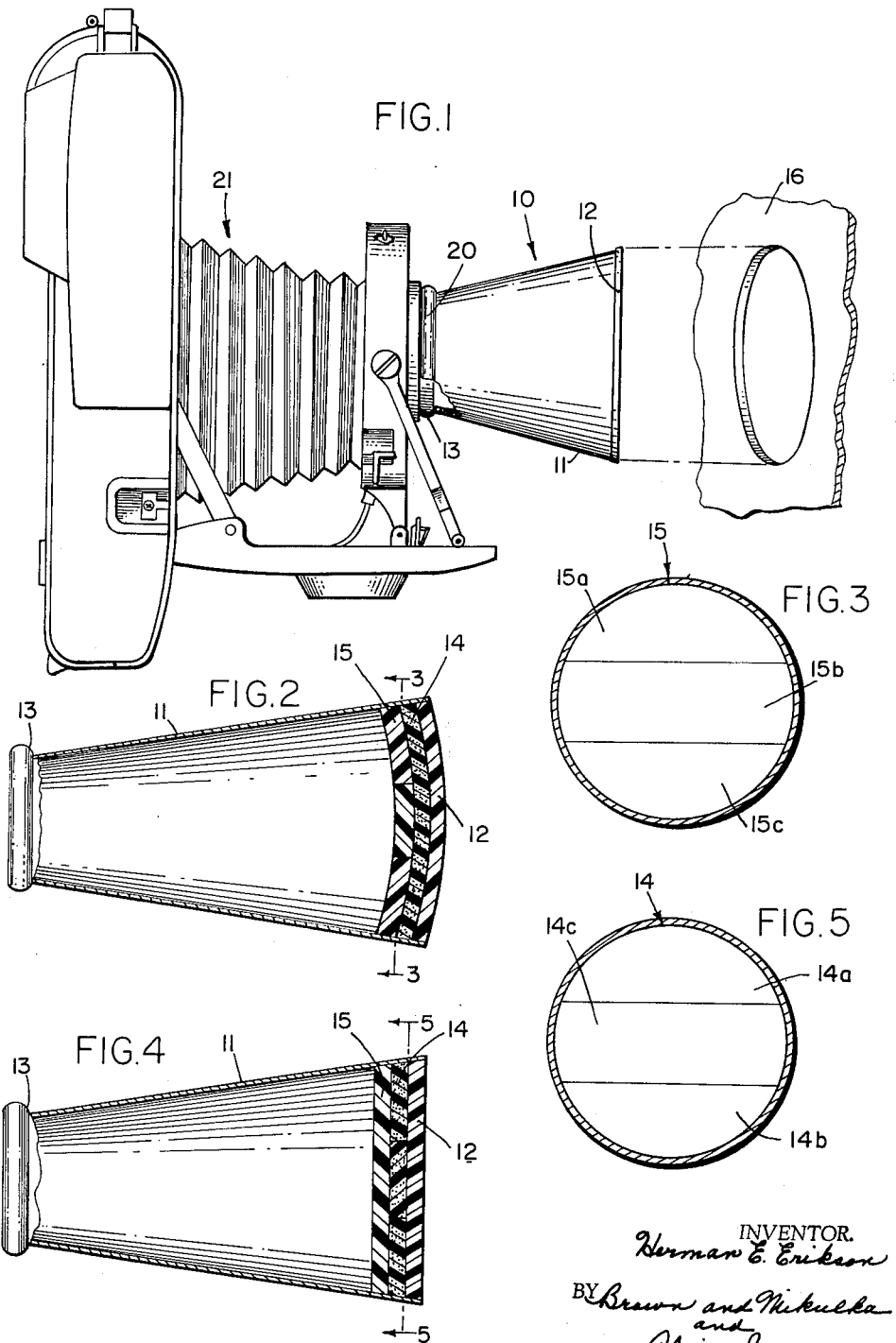

April 19, 1966     H. E. ERIKSON     3,247,378
RADIATION DETECTION DEVICE WITH AN INTENSIFIER SCREEN
Filed May 25, 1962     2 Sheets-Sheet 2
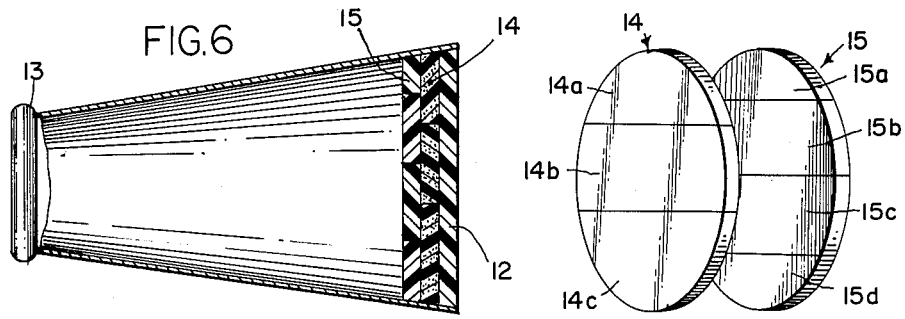
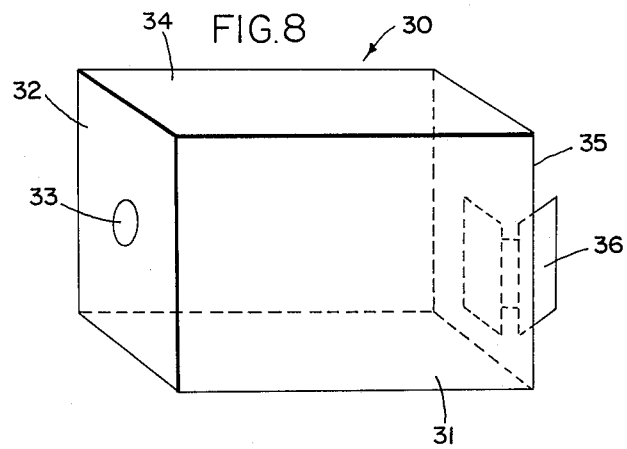
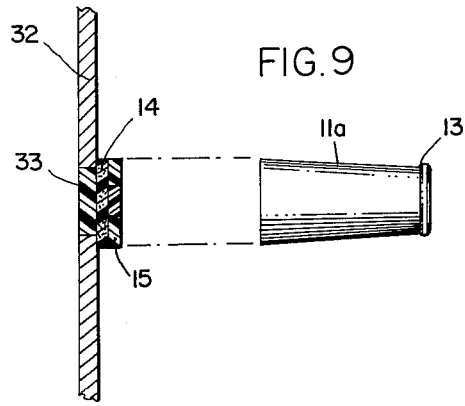
INVENTOR.
Herman E. Erikson
BY Brown and Mikulka
and
Alvin Isaacs
ATTORNEYS

3,247,378
RADIATION DETECTION DEVICE WITH AN INTENSIFIER SCREEN
Herman E. Erikson, Winchester, Mass., assignor to Polaroid Corporation, Cambridge, Mass., a corporation of Delaware
Filed May 25, 1962, Ser. No. 197,748
17 Claims. (Cl. 250—78)

This invention relates to radiation detection devices, and more particularly to means for determining or measuring the amount of radiation emanating from radioactive or fissionable materials, said means being commonly referred to as a "dosimeter."

The present invention is particularly concerned with the detection and measuring of the range or degree of electromagnetic short-wave radiation lying within a wavelength range of from 0.2 A. units to 0.002 A. units, i.e., X-rays and gamma rays. However, the term "radiation" as used herein includes not only electromagnetic radiation having a wavelength shorter than a wavelength in the ultraviolet region of the spectrum, but also the corpuscular radiation of alpha particles, beta particles, fission product particles, etc. The term "dose," from which the term "dosimeter" is derived, has reference to quantity of radiation and is measured in roentgens or "r."

Dosimeters or devices for providing a visible indication of the extent of radiation present in a given area are of course well known.

One object of the present invention is to provide an improved device of the foregoing type.

Another object is to provide a dosimeter which will enable one to obtain a graduated reading of the amount of radiation.

Still another object is to provide a dosimeter which will provide a visible calibrated measure of the amount of radiation so that the user may determine with safety the degree of lethalness of the radiation and the danger of exposure thereto.

Yet another object is to provide a device which, when attached to the lens of a presently available camera, will provide a simple and highly efficient dosimeter.

A further object is to provide a camera attachment adapted to be used with conventional photosensitive materials to determine the dose to which the user may be exposed.

A still further object is to provide a device particularly useful with self-developing cameras to obtain in a matter of seconds a photographic print indicating the amount of radiation present.

These and other objects of the invention will in part be obvious and will in part appear hereinafter.

The invention accordingly comprises the several steps and the relation and order of one or more of such steps with respect to each of the others, and the apparatus possessing the construction, combination of elements and arrangement of parts which are exemplified in the following detailed disclosure, and the scope of the application of which will be indicated in the claims.

For a fuller understanding of the nature and objects of this invention, reference should be had to the following detailed description taken in connection with the accompanying drawings wherein:

FIGURE 1 is a side elevational view of a self-developing camera containing one embodiment of the novel attachment device of this invention;

FIG. 2 is a side elevational, partly cross-sectional view of the novel attachment device of FIGURE 1;

FIG. 3 is a front elevational view of one element of the device shown in FIG. 2;

FIG. 4 is a side elevational, partly cross-sectional view of another embodiment of the invention;

FIG. 5 is a front elevational view of one element of the device shown in FIG. 4;

FIG. 6 is a side elevational, partly cross-sectional view of yet another embodiment of the invention;

FIG. 7 is an exploded view of two elements of the device shown in FIG. 6, illustrating the alignment of the said elements with one another.

FIG. 8 is a perspective view of still another embodiment of this invention; and

FIG. 9 is a partly diagrammatic, partly sectional view of the embodiment of FIG. 8, showing the elements of the device in exploded relationship with one another.

The usefulness of being able to determine not only whether there is radiation present, but also the extent or degree of any such dose, should be apparent. Thus, a dosimeter is useful, not only as a detecting device in the event of a nuclear war, but also in the peaceful utilization of radioactive materials. Assuming that radiation emanting from radioactive or fissionable materials is in fact present, it may be vital that one who is exposed or is potentially to be exposed to the radiation know the extent of the dose. For example, it has been stated that one subjected to a dose of 200 roentgens within a period of a few hours would probably have radiation sickness, while if the dose were smaller, he probably would not. Thus, assuming radiation is present, it is important that one know the extent of the dose in order to determine whether exposure is safe, or the amount of time he may safely be exposed to the dose.

The present invention provides a device which can be used with conventional cameras and film, such as one might be expected ordinarily to possess, and provides a calibrated measurement of the extent of the dose, if any, to which one might be subjected. The dosimeter of this invention may be used with complete safety without exposure of the practitioner to the radiation.

FIGURES 1–3 illustrate one embodiment of the invention. As shown therein, there is provided an attachment device 10 adapted releasably to engage the lens 20 of a camera 21. While camera 21 has been shown, for purposes of illustration, as a bellows camera, it will be appreciated that other type cameras may also be employed. As shown in FIGURE 1, attachment 10 has a hollow tubular member 11 which is at least opaque to actinic light and which may be made of a material, such as lead, which resists the transmission of at least small doses of radiation. Attachment 10 is releasably secured to lens 20 by means of flange 13 which may be made, for example, of a resilient material, plastic or metal, which may be expanded to fit over various size lenses, thereby holding attachment 10 securely in place. It will be appreciated that other means for securing attachment 10 against the lens of a camera are within the knowledge of those skilled in the art and are therefore within the scope of the invention. For example, it is contemplated that adaptor means comprising a circular member threaded at its outer circumference may be mounted over or against the camera lens and flange 13 may be provided with matching threads at its internal circumference to engage the outer circumference of the adaptor member.

At the end of attachment 10 opposite to flange 13, there is provided a member 12 which is opaque to actinic light but permits passage therethrough of radiation from radioactive or fissionable materials. Member 12, which may be made of known materials, e.g., black paper base materials, opaque metals, plastics and the like, tightly engages the surface of attachment 10, thereby effectively precluding the passage of visible light thereto and to the camera lens at the other end of the device. At some point interior to member 12 and mounted vertically within attachment 10, an intensifier screen 14 is provided. Intensifier screens are well known in the art and emit visible light when excited by or bombarded with X-rays and the like. Such screens are commonly employed in preparing radiographs, fluoroscopic work, etc. As an example of such a screen, mention may be made of "Du Pont CB2," trade name for a zinc cadmium sulfide intensifier screen sold by E. I. du Pont Nemours & Co., Wilmington, Delaware.

Adjacent to intensifier screen 14 and mounted parallel thereto between screen 14 and the end of the attachment to be secured to the camera, is provided a member 15 containing a plurality of neutral density filters whose surfaces are in the same plane. The side surfaces of the filters may be laminated to one another to fasten the filters in the same plane in contiguous relationship with one another. Alternatively, member 15 may comprise frame means having a plurality of openings into which the filters may be inserted. For purposes of illustration, FIGURE 3 shows member 15 as consisting of three such filters, 15a, 15b and 15c, laminated together as a unitary structure.

As is well known in the art, the purpose of neutral density filters is to decrease uniformly the amount of visible light passing therethrough. In the practice of the present invention as illustrated in FIGURES 1–3, the plurality of filters of member 15 are of varying transparency to visible light, so that each filter of member 15 permits the passage of visible light emanating from intensifier screen 14 to a greater or lesser extent than do the remaining filters. In the embodiment illustrated in FIG. 3, for example, filter 15a is a medium filter; filter 15b is a low filter, e.g., a filter which absorbs comparatively little light; and filter 15c is a high filter, e.g., a filter that transmits comparatively little light. Alternatively, filter 15b may be eliminated and replaced, for example, with ordinary plate glass. Where frame means are provided, in lieu of the laminated structure of FIG. 3, it will be apparaent that the plate glass may also be eliminated, where no low density filter is desired.

Where one wishes to know the amount of radiation, if any, present in a given area, he merely aims the camera in that direction (preferably through an opening in a lead shield 16 or the like, so as not to expose himself to the radiation) and takes a picture using his conventional camera and film. If there is no radiation, no image will be recorded, as member 12 precludes the passage of visible light. If radiation is present, it will pass through member 12 and strike intensifier screen 14, thereby exciting it to emit visible light which may, if of sufficient intensity, pass through neutral density filters 15a, 15b, and/or 15c to varying extents, thereby recording a visible record of the radiation on the film in the camera 21 in three distinct bands corresponding to the three filters, 15a, 15b and 15c. These three bands will each be either black, grey or white, depending on the amount of visible light emitted by the screen and transmitted through the various filters and this, in turn, is dependent upon the amount of radiation striking the screen. In a positive image, the white areas of the bands (exposed areas of the negative) will indicate greater dosage while the darker the band, the lesser exposure. It is contemplated that the dosage may be precalibrated for the particular detecting device used, and a chart furnished to each user so that all he need do is distinguish between black, grey and white and compare his print with the precalibrated chart furnished to him. Thus, for example, a black, a grey and a white band on the print would indicate one dose, a black and two grey bands another dose, and so on through the various combinations and permutations possible with the number of bands visible on the print.

The invention is particularly useful with diffusion transfer processes utilizing any of the Polaroid Land cameras and the various films commercially available for use therewith, whereby the user can, in a matter of seconds, obtain a finished positive indicating the amount of radiation.

In the embodiment illustrated in FIGS. 4 and 5, member 15 contains a single neutral density filter and the plurality of bands on the print is obtained instead by using a plurality of intensifier screens 14a, 14b, and 14c which emit varying amounts of visible light upon excitation. Such screens, which emit varying amounts of visible light upon excitation by radiation of a given intensity, are of course well known in the art.

In the embodiment illustrated in FIGS. 6 and 7, member 14 contains a plurality of intensifier screens, 14a, 14b, and 14c, which emit varying amounts of visible light, and member 15 contains a plurality of neutral density filters, 15a, 15b, 15c and 15d, of varying ability to transmit visible light, the screens and filters being so aligned with respect to one another that each filter overlaps two or more screens and vice versa so that the number of possible different bands appearing on the print is determined by the number of filters and the number of screens employed, rather than by the number of either alone.

In the embodiment described in FIGS. 8 and 9, use is made of a container 30 of suitable shape and dimension to confine a camera and to enable the practitioner to record a visible image while the camera is confined therein. Container 30, which functions as a shield against radiation, is composed of a material that is adapted effectively to preclude or to attenuate penetrative radiation passing therethrough. As examples of such materials, mention may be made of heavy metals such as lead.

As shown in FIG. 8, container 30 has a top 34, sides 31, a front 32 and a back 35. Container 30 also preferably but not necessarily contains a bottom, thereby forming a complete enclosure, although it will be appreciated that the container may be supported by a suitable surface, thereby eliminating the need for a bottom. Front member 32 is provided with means 33 for permitting the passage of the dose, if any, into the container. In the embodiment illustrated in FIG. 9, means 33 is shown to contain a material 33 which is opaque to visible light, similar to member 12 of FIGURES 1–6. Screen 14 and member 15 containing a plurality of neutral density filters is provided, as in FIGURES 2–3. It is also within the scope of the invention to provide a plurality of screens as in FIGS. 4–7. As shown in FIG. 9, the faces of members 14 and 15 are preferably slightly larger than the face of means 33, to insure that any dose passing through means 33 also strikes member 14 and the visible light emitted by excitation of the screen or screens in member 14 in turn passes through the filter or filters of member 15. At least member 15 is preferably but not necessarily confined in a hollow tubular container 11a provided with a flange 13 for releasably engaging the lens of a camera (not shown) within container 30. Tubular container 11a is preferably but not necessarily opaque to visible light. Where desired, tubular container 11a may be dispensed with and the camera positioned a suitable distance behind member 15.

Means 33 may also be an orifice against which or near which the device of FIGURES 1–7 is positioned, so that container 30 functions as a shield for said device, in lieu of shield 16 shown in FIGURE 1.

As shown in FIGURE 8, container 30 is also provided with a door or equivalent means for insertion of the camera and recording a visible image by pointing means 33 in the direction to be photographed.

It will be appreciated that the embodiments shown in the drawings are for purposes of illustration only, the invention not being limited thereto. While, for purposes of illustration, tubular members 11 and 11a have been shown as being truncated and container 30 has been shown to be of a box-like configuration, it will be apparent that other shapes and designs may also be employed. It will also be appreciated that more or less numbers of the plurality of filters and/or screens may be employed, depending upon the degree of calibration desired.

The following example shows by way of illustration, and not by way of limitation, the use of the novel dosimeter of this invention in detecting the degree of radiation present.

EXAMPLE 1

A tubular member of the character illustrated in FIGURE 1 was attached to a Polaroid Land camera, Model 150, which had a closeup lens positioned thereon. The tubular member, which was of a truncated configuration as shown in the drawing, was made of black "Bakelite" (trade name for a thermosetting phenolic plastic manufactured by the Bakelite Co.). Member 12 was also made of black Bakelite. The intensifier screen was a "Du Pont CB2" screen (trade name for a zinc cadmium sulfide high efficiency intensifier screen commonly used in fluoroscopic work). Member 15 consisted of three substantially rectangular neutral density filter affixed one above the other, the topmost being a 1.2 medium filter, the middle one a 0.6 low filter (little reduction of light intensity) and the bottommost one a 1.8 high filter (greatest reduction of light intensity). Each filter was a "Wratten Gelatin Filter No. 96" (trade name of a neutral density filter manufactured by Eastman Kodak Company) prefixed by the density factors, 1.2, 0.6 and 1.8 respectively. The distance between the intensifier screen and the camera lens was approximately 5 inches, the distance being predetermined so that the screen was in focus with the lens. A series of photographs were taken by exposing the above-mentioned dosimeter to a series of varying doses of X-ray radiation. The negatives were processed by conventional diffusion transfer procedures to obtain a series of positive images showing three distinct bands corresponding to the three filters, each band being either black, grey or white, according to the degree of exposure (black indicating little or no exposure and white being the opposite extreme, reflecting a high exposure to radiation). The following table shows the relationship of the color of the bands appearing on the positive prints to the amount of radiation present:

Table 1

| Relationship of Band to Filter | Color, Below, 50 mr. | Color, 100-300 mr. | Color, 300 mr.-1 r. | Color, 1-10 r. | Color, 10-50 r. | Color, 50-100 r. | Color, 200 r. or more |
|---|---|---|---|---|---|---|---|
| Top Band (Medium Filter) | Black | Black | Black | Grey | White | White | White. |
| Middle Band (Low Filter) | do | Grey | White | White | do | do | Do. |
| Bottom Band (High Filter) | do | Black | Black | Black | Black | Grey | Do. |

From the foregoing example, it will be seen that a dosimeter is provided which utilizes available cameras and films and which provides a graduated reading from below 50 mr. to 200 r. and above. Below 50 mr., there was no exposure and a positive image was obtained containing three black bands. On the opposite end of the chart, a dose of 200 or more roentgens gave a positive image which was fully exposed and contained three white bands. The intermediate doses gave various combinations of black, grey and/or white bands, as indicated in the chart. It will be apparent that the particular dose within a given range on the chart may be more closely ascertained, if so desired, by noting the particular shade. For example, if the top band is a very dark grey, the dose should be closer to 1 r., while a very light grey would indicate a dose closer to 10 r. However, such fine calibration would ordinarily not be necessary and one need only distinguish between black, grey and white to ascertain the dose in a particular area.

It will be appreciated that the foregoing chart merely exemplifies the readings which may be obtained by the practice of this invention. Obviously fewer or greater combinations of screens and filters may be employed to give rougher or finer calibrations of the extent of radiation. Moreover, different screens and/or filters other than neutral density filters may also be employed. It will also be appreciated that, when found desirable or expedient to do so, a closeup lens may be provided as an element of attachment 10 by securing by suitable means at or near the open end of the attachment. It is therefore to be expressly understood that the foregoing example is by way of illustration only, and the results tabulated in Table 1 are illustrative only of the particular intensifier screen and filters employed.

Since certain changes may be made in the above apparatus and process without departing from the scope of the invention herein involved, it is intended that all matter contained in the above description or shown in the accompanying drawings shall be interpreted as illustrative and not in a limiting sense.

What is claimed is:

1. A radiation detecting device comprising means defining a chamber opaque to actinic light; means for admitting radiation from a radioactive source into said chamber at one end thereof; means within said chamber for emitting visible light when excited by said radiation; and visible light filter means positioned between said visible light-emitting means and the opposed end of said chamber, said filter means so cooperating with said visible light-emitting means as to be capable of converting said admitted radiation to a pattern of visible light having areas of graduated levels of intensity.

2. A radiation detecting device comprising means opaque to actinic light defining a chamber open at one end; means opposite said open end for admitting radiation from a radioactive source into said chamber; means within said chamber for emitting visible light when excited by said radiation, said visible light-emitting means being positioned within said chamber between said radiation-admitting means and said open end; and visible light filter means positioned between said visible light-emitting means and said open end, said filter means so co-operating with said visible light-emitting means as to be capable of converting said admitted radiation to a pattern of visible light having areas of graduated levels of intensity.

3. A device as defined in claim 2 wherein said open end is adapted to be placed in juxtaposition with the lens of a camera.

4. A device as defined in claim 2 wherein said means for emitting visible light comprises at least one intensifier screen.

5. A device as defined in claim 4 wherein said means comprises a plurality of intensifier screens of varying intensity.

6. A device as defined in claim 2 wherein said filter means comprises at least one neutral density filter.

7. A device as defined in claim 6 wherein said filter means comprises a plurality of neutral density filters of varying transparency to visible light.

8. A device as defined in claim 2 including a camera, the lens of said camera being releasably engaged to said open end of said chamber.

9. A device as defined in claim 2 including a closeup lens positioned adjacent to said open end.

10. A radiation detecting device comprising means opaque to actinic light defining a tubular chamber open at one end; means at the end opposite said open end for admitting radiation from a radioactive source into said tubular chamber; means within said chamber and adjacent to said radiation-admitting means for emitting visible light when excited by said radiation, said visible light-emitting means being in intimate contact with the interior walls of said chamber with the face thereof parallel to said radiation-admitting means; and light filter means positioned between said emitting means and said open end parallel to and contiguous with said emitting means, said filter means so co-operating with said visible light-emitting means as to be capable of converting said admitted radiation to a pattern of visible light having areas of graduated levels of intensity.

11. A device as defined in claim 10 wherein said filter means contains a plurality of filters of varying transparency to visible light.

12. A device as defined in claim 11 wherein said filter means comprises at least one high filter, at least one medium filter, and at least one low filter.

13. A device as defined in claim 10 including means associated with said open end for releasably engaging the lens of a camera.

14. A device as defined in claim 10 wherein said means for emitting visible light comprises at least one intensifier screen.

15. A device as defined in claim 14 wherein said means comprises a plurality of intensifier screens of varying intensity.

16. A device as defined in claim 15 including protecting means associated with said device, said protecting means comprising a shield from said radiation, said protecting means being so positioned with respect to said device that radiation is permitted only to impinge upon said visible light-emitting means through said radiation-admitting means.

17. A device as defined in claim 16 wherein said protecting means comprises enclosing means, said enclosing means being provided with an orifice, said radiation-admitting means being in intimate contact with the interior walls defining said orifice.

References Cited by the Examiner

UNITED STATES PATENTS

| | | | |
|---|---|---|---|
| 2,205,853 | 6/1940 | Jany | 250—78 X |
| 2,585,551 | 2/1952 | Hofstadter | 250—83 |
| 2,590,080 | 3/1952 | Adams | 88—108 X |
| 2,623,181 | 12/1952 | Goodrick | 250—65 |
| 2,624,011 | 12/1952 | Stern | 250—83 X |
| 2,721,274 | 10/1955 | Garbellano et al. | 250—78 X |

RALPH G. NILSON, *Primary Examiner.*

ARCHIE R. BORCHELT, *Examiner.*